US00RE45558E

(19) United States
(12) Reissued Patent
Lu et al.

(10) Patent Number: US RE45,558 E
(45) Date of Reissued Patent: Jun. 9, 2015

(54) SUPERVISING USER INTERACTION WITH ONLINE SERVICES

(71) Applicant: Facebook, Inc., Menlo Park, CA (US)

(72) Inventors: Larry L. Lu, Great Falls, VA (US); Eric O' Laughlen, Aldie, VA (US); John Crowley, Bethesda, MD (US)

(73) Assignee: FACEBOOK, INC., Menlo Park, CA (US)

(21) Appl. No.: 13/791,506

(22) Filed: Mar. 8, 2013

Related U.S. Patent Documents

Reissue of:
(64) Patent No.: 7,904,554
Issued: Mar. 8, 2011
Appl. No.: 12/646,505
Filed: Dec. 23, 2009

U.S. Applications:
(63) Continuation of application No. 10/330,561, filed on Dec. 30, 2002, now Pat. No. 7,640,336.

(51) Int. Cl.
*G06F 15/173* (2006.01)
*H04L 12/58* (2006.01)
*G06Q 10/10* (2012.01)
*H04L 12/26* (2006.01)

(52) U.S. Cl.
CPC ..... *H04L 51/12* (2013.01); *H04L 43/06* (2013.01); *H04L 51/16* (2013.01); *H04L 51/32* (2013.01); *G06Q 10/10* (2013.01)

(58) Field of Classification Search
CPC ..... G06Q 10/10
USPC ..... 709/206, 224; 715/243, 437
See application file for complete search history.

(56) References Cited

U.S. PATENT DOCUMENTS 5,101,424 A 3/1992 Clayto et al.
5,315,504 A 5/1994 Lemble
5,339,391 A 8/1994 Wroblewski et al.

(Continued)

FOREIGN PATENT DOCUMENTS

EP 0375138 6/1990
EP 0827063 3/1998

(Continued)

OTHER PUBLICATIONS

The Wall Street Journal Article, "Esniff Ferrets Out Misbehavior by 'Reading' E-Mail, Web Visits," Katherine Lange, interactive.wsj.com, Apr. 27, 2001:Tech Q&A.

(Continued)

*Primary Examiner* — Joshua Campbell
(74) *Attorney, Agent, or Firm* — Keller Jolley Preece

(57) ABSTRACT

A report card provides a supervisor or master account holder (e.g., a parent) with information about the activities of an individual or sub-account user (e.g., a child). For example, the report card may include a list of the sites (e.g., content identifiers and/or uniform resource locators) that an individual has visited or attempted to visit. Other information (e.g., e-mail and address book activity and instant messaging and contact list activity) also may be provided in addition to tools that allow the master account holder to access information about the activities and to adjust parental controls for the activities.

35 Claims, 6 Drawing Sheets

(56) References Cited

U.S. PATENT DOCUMENTS 5,479,600 A 12/1995 Wroblewski et al.
5,532,715 A 7/1996 Bates et al.
5,619,648 A 4/1997 Canale et al.
5,694,523 A 12/1997 Wical
5,796,948 A 8/1998 Cohen
5,826,261 A 10/1998 Spencer
5,835,722 A * 11/1998 Bradshaw et al. ..... 709/225
5,877,759 A 3/1999 Bauer
5,878,219 A 3/1999 Vance, Jr. et al.
5,895,465 A 4/1999 Guha
5,913,214 A 6/1999 Madnick et al.
5,924,090 A 7/1999 Krellenstein
5,933,827 A 8/1999 Cole et al.
5,940,821 A 8/1999 Wical
5,982,369 A 11/1999 Sciammarella et al.
5,983,214 A 11/1999 Lang et al.
5,987,446 A 11/1999 Corey
5,987,611 A 11/1999 Freund
5,991,756 A 11/1999 Wu
5,999,932 A 12/1999 Paul
6,023,723 A 2/2000 McCormick et al.
6,026,429 A 2/2000 Jones et al.
6,038,610 A 3/2000 Belfiore et al.
6,055,540 A 4/2000 Snow et al.
6,055,572 A 4/2000 Saksena
6,065,056 A * 5/2000 Bradshaw et al. ..... 709/229
6,073,142 A 6/2000 Geiger et al.
6,076,100 A 6/2000 Cottrille
6,078,866 A 6/2000 Buck et al.
6,081,805 A 6/2000 Guha
6,094,657 A 7/2000 Hailpern et al.
6,098,066 A 8/2000 Snow et al.
6,101,310 A 8/2000 Terada et al.
6,108,651 A 8/2000 Guha
6,112,201 A 8/2000 Wical
6,112,227 A 8/2000 Heiner
6,125,353 A 9/2000 Yagasaki
6,128,739 A 10/2000 Fleming et al.
6,145,004 A 11/2000 Walsh
6,167,450 A 12/2000 Angwin et al.
6,175,830 B1 1/2001 Maynard
6,182,081 B1 1/2001 Dietl et al.
6,199,102 B1 3/2001 Cobb
6,266,664 B1 7/2001 Russell-Falla et al.
6,275,820 B1 8/2001 Navin-Chandra
6,278,993 B1 8/2001 Kumar
6,321,224 B1 11/2001 Beall et al.
6,327,590 B1 12/2001 Chidlovskii
6,339,437 B1 1/2002 Nielsen
6,339,784 B1 1/2002 Morris et al.
6,356,899 B1 3/2002 Chakrabarti et al.
6,370,527 B1 4/2002 Singhal
6,385,602 B1 5/2002 Tso et al.
6,393,464 B1 5/2002 Dieterman
6,442,549 B1 8/2002 Schneider
6,456,998 B1 9/2002 Bui
6,460,034 B1 10/2002 Wical
6,463,430 B1 10/2002 Brady et al.
6,480,885 B1 11/2002 Olivier
6,505,194 B1 1/2003 Nikolovska et al.
6,519,639 B1 2/2003 Glasser et al.
6,546,416 B1 4/2003 Kirsch
6,560,600 B1 5/2003 Broder
6,564,787 B1 5/2003 Aronson et al.
6,571,256 B1 * 5/2003 Dorian et al. ..... 726/2
6,574,632 B2 6/2003 Fox
6,601,061 B1 7/2003 Holt
6,606,620 B1 8/2003 Sundaresan et al.
6,606,657 B1 * 8/2003 Zilberstein et al. ..... 709/224
6,615,248 B1 9/2003 Smith
6,628,766 B1 9/2003 Hollis et al.
6,631,244 B2 10/2003 Suginaga
6,643,641 B1 11/2003 Snyder
6,654,787 B1 11/2003 Aronson et al.
6,701,310 B1 3/2004 Sugiura et al.
6,704,728 B1 3/2004 Chang et al.
6,704,729 B1 3/2004 Klein
6,718,365 B1 4/2004 Dutta
6,721,741 B1 4/2004 Eyal et al.
6,732,157 B1 5/2004 Gordon et al.
6,745,227 B1 6/2004 Bates
6,745,367 B1 6/2004 Bates et al.
6,769,009 B1 7/2004 Reisman
6,785,671 B1 8/2004 Bailey
6,785,824 B1 8/2004 Grassle
6,795,856 B1 9/2004 Bunch
6,854,074 B2 2/2005 McLellan et al.
6,859,807 B1 2/2005 Knight
6,892,074 B2 5/2005 Tarkiainen et al.
6,938,021 B2 8/2005 Shear
6,950,989 B2 9/2005 Rosenzweig et al.
6,957,229 B1 * 10/2005 Dyor ..... 709/223
6,983,379 B1 1/2006 Spalink et al.
7,046,139 B2 5/2006 Kuhn et al.
7,051,116 B1 * 5/2006 Rodriguez-Val et al. ..... 709/245
7,174,453 B2 * 2/2007 Lu ..... 713/154
7,194,536 B2 * 3/2007 Fellenstein et al. ..... 709/224
7,246,128 B2 7/2007 Jordahl
7,302,488 B2 * 11/2007 Mathew et al. ..... 709/229
7,424,676 B1 9/2008 Carlson
7,640,336 B1 * 12/2009 Lu et al. ..... 709/224
7,904,554 B1 3/2011 Lu
8,099,780 B2 1/2012 Lu
8,776,222 B2 7/2014 Lu
2001/0003828 A1 6/2001 Peterson et al.
2001/0012286 A1 8/2001 Huna et al.
2002/0049806 A1 * 4/2002 Gatz et al. ..... 709/203
2002/0049907 A1 4/2002 Woods et al.
2002/0052919 A1 5/2002 Morris et al.
2002/0083179 A1 6/2002 Shaw et al.
2002/0091936 A1 7/2002 Tema
2002/0095415 A1 7/2002 Walker et al.
2002/0107950 A1 8/2002 Lu
2002/0120866 A1 8/2002 Mitchell et al.
2002/0129015 A1 9/2002 Caudill et al.
2002/0165777 A1 11/2002 Lotvin et al.
2002/0181703 A1 12/2002 Logan et al.
2002/0184496 A1 * 12/2002 Mitchell et al. ..... 713/168
2003/0023736 A1 1/2003 Abkemeier
2003/0061111 A1 3/2003 Dutta et al.
2003/0105822 A1 * 6/2003 Gusler et al. ..... 709/206
2003/0110168 A1 * 6/2003 Kester et al. ..... 707/6
2003/0177111 A1 9/2003 Egendorf
2003/0204741 A1 10/2003 Schoen et al.
2004/0003071 A1 * 1/2004 Mathew et al. ..... 709/223
2004/0003279 A1 1/2004 Beilinson et al.
2004/0006621 A1 * 1/2004 Bellinson et al. ..... 709/225
2004/0010720 A1 1/2004 Singh et al.
2004/0019650 A1 * 1/2004 Auvenshine ..... 709/206
2004/0093384 A1 5/2004 Shipp
2004/0111479 A1 * 6/2004 Borden et al. ..... 709/206
2004/0148347 A1 7/2004 Appelman et al.
2004/0154022 A1 8/2004 Boss et al.
2004/0177015 A1 9/2004 Galai
2004/0181690 A1 9/2004 Rothermel et al.
2004/0203363 A1 10/2004 Carlton et al.
2004/0249938 A1 * 12/2004 Bunch ..... 709/224
2005/0004949 A1 1/2005 Trepess et al.
2005/0044181 A1 2/2005 Lee
2005/0050222 A1 3/2005 Packer
2005/0055416 A1 3/2005 Heikes et al.
2005/0055450 A1 3/2005 Gang
2005/0076060 A1 4/2005 Finn et al.
2005/0091385 A1 4/2005 Nordstrom
2005/0102407 A1 5/2005 Clapper
2005/0108227 A1 * 5/2005 Russell-Falla et al. ..... 707/5
2005/0144297 A1 6/2005 Dahlstrom et al.
2005/0149622 A1 7/2005 Kirkland et al.
2005/0160144 A1 7/2005 Bhatia
2005/0210387 A1 9/2005 Alagappan et al.
2005/0228881 A1 10/2005 Reasor et al.
2005/0282530 A1 12/2005 Raff
2006/0075358 A1 4/2006 Ahokas
2006/0085419 A1 4/2006 Rosen

(56) References Cited

U.S. PATENT DOCUMENTS

| | | | | |
|---|---|---|---|---|
| 2006/0127870 | A1 | 6/2006 | Fields et al. | |
| 2006/0155764 | A1 | 7/2006 | Tao | |
| 2006/0161668 | A1 | 7/2006 | Mathew et al. | |
| 2006/0161669 | A1 | 7/2006 | Mathew et al. | |
| 2006/0168186 | A1 | 7/2006 | Mathew et al. | |
| 2006/0173792 | A1 | 8/2006 | Glass | |
| 2006/0173793 | A1 | 8/2006 | Glass | |
| 2006/0263757 | A1 | 11/2006 | Bender | |
| 2007/0061869 | A1 | 3/2007 | DeHaas | |
| 2007/0143281 | A1 | 6/2007 | Smirin et al. | |
| 2007/0162507 | A1 | 7/2007 | McGovern et al. | |
| 2008/0275820 | A1* | 11/2008 | Joao et al. | 705/44 |
| 2011/0238478 | A1* | 9/2011 | Gottfurcht et al. | 705/14.25 |
| 2013/0018971 | A1 | 1/2013 | Lu | |
| 2013/0173721 | A1 | 7/2013 | Lu | |

FOREIGN PATENT DOCUMENTS

| | | |
|---|---|---|
| EP | 0918295 | 5/1999 |
| EP | 0945811 | 9/1999 |
| EP | 1045547 | 10/2000 |
| EP | 1079318 | 2/2001 |
| EP | 1209866 | 5/2002 |
| JP | 2000-357176 | 12/2000 |
| JP | 2000357176 | 12/2000 |
| WO | WO 99/39286 | 8/1999 |
| WO | WO 00/26762 | 5/2000 |
| WO | WO 00/58894 | 10/2000 |
| WO | WO 00/68815 | 11/2000 |
| WO | WO 01/16806 | 3/2001 |
| WO | WO 01/27720 | 4/2001 |

OTHER PUBLICATIONS

The Early Report-The Early Show segment, "Big Brother in The Corner Office," Julie Chen, cbsnews.com/earlyshow/caught/techage/20001228e_sniff.shtml, Dec. 28, 2000: Tech Age.

"The eSniff Product Overview," eSniff: Define Your e-Boundaries, www.esniff.com/product_overview.html, May 15, 2001.

Nigel Miller, Can an employer monitor its employees' E-mail?, Computer Audit Update, May 1997, pp. 30-31.

Notification of Transmittal of the International Search Report or the Declaration in PCT US01/48749, on Apr. 11, 2002.

"Guardian Setup Instructions" [online], America Online [retrieved Nov. 23, 2004]; retrieved from the Internet: http://challenevents.aol.com/guardian/images/print-instructions:gif.

"Guardian an e-mail report that shows parents what their children are doing online" [online], America Online [retrieved on Nov. 23, 2004]; retrieved from the Internet: http://challenevents.aol.com/guardian/.

"Parental Controls" [online], America Online [retrieved on Nov. 23, 2004]; retrieved from the Internet: http://www.aol.com/info/parentalcontrol.html/.

Ignite Software: Parent Tools Feature Set, "Parent Tools Features," http://www.parent-tools.com/features.htm, Ignite Software, pp. 1-3, as accessed on Dec. 10, 2003.

Parent Tools—The Ultimate in Monitoring an Controlling AIMe, "Parent Tools in AIM," http://www.parent-tools.com/screenshots.htm, pp. 1-4, as accessed on Dec. 10, 2003.

McMurray, Sandy, "Shield your children from unsuitable Internet content," http://www.microsoft.com/canada/home.internet&security/2.4.8_protectwithparentalcontrolshowtosafeguardyourcomputer.asp#, Microsoft Home Magazine, pp. 1-3, as accessed on Dec. 10, 2003.

"Spammers Target Instant Message Users," http://www.bizreport.com/article.php?art_id=5507. Nov. 13, 2003, pp. 1-4.

Olsen, Stefanie, "Will instant messaging become instant spamming?," http://news.com.com/2100-1023-252765.html?legacy=cnet, Feb. 16, 2001, pp. 1-4.

"Protect Your Privacy," MSN Features, http://mesenger.msn.com/Feature/Privacy.aspx, as accessed on Dec. 2, 2003.

"Knock Settings—Servers Tab," http://www.knockmail.com/support/adserverset.html, pp. 1-2, as accessed on Dec. 4, 2003.

"Preview Pending Emails in KnockMail," http://www.knockmail.com/support/previewemail.html, pp. 1-2, as accessed on Dec. 4, 2003.

"Managing your Addresses in KnockMail," http://www.knockmail.com/support/manaddresses.html, pp. 1-2, as accessed on Dec. 4, 2003.

"Approved Database," http://www.knockmail.com/support/appdatabase.html, pp. 1, as accessed on Dec. 4, 2003.

"Denied Database for KnockKnock," http://www.knockmail.com/support/denydatbase.html, pp. 1, as accessed on Dec. 4, 2003.

"Email Server Control for KnockKnock," http://www.knockmail.com/support/emailservcont.html, pp. 1-2, as accessed on Dec. 4, 2003.

"Listserv Control for KnockKnock," http://www.knockmail.com/support/listservcont.html, pp. 1, as accessed on Dec. 4, 2003.

"Using KnockKnock," reprinted from http://www.knockmail.com/support/using knock.html on Dec. 4, 2003.

Jim Hu, "AOL developing search engine," CNET.com-News—Entertainment & Media—AOL developing search engine, pp. 1-3 [online], (Jun. 21, 1999) [retrieved on Jul. 26, 2000]. Retrieved from the Internet: <URL : http://news.cnet.com/news/0-1005-200-343860.html>.

Ian Leicht, "Re: My spamblock; Was: Thwarting UCE address culling programs" [online]. Jan. 26, 1997. Retrieved from Internet newsgroup: <news.admin.net-abuse.email> [retrieved on Jul. 15, 2003], pp. 1-2.

"Development and Operation of the Next-Generation Rating/Filtering System on the Internet," (XP002219058). Retrieved from the Internet:<URL:http://www.nmda.or.jp/enc/rating2nd-en.html> on Oct. 30, 2002.

T. Negrino, "The MacWorld Web Searcher's Companion," MacWorld, PC World Communications, San Francisco, CA, US, vol. 17, No. 5, May 2000, pp. 76-82 (XP008019722).

"Knock Knock Settings," reprinted from http://www.knockmail.com/support/newsettings.jpg, as accessed on Dec. 4, 2003.

Sentry Remote: *Sentry Remote*, at: http://web.archive.org/web/20070629024905/www.sentryparentalcontrols.com/Content/Products/Remote.aspx, Jun. 2007.

Bjerkie, "E-mail: The Boss is Watching", Apr. 1, 1993, Internet and Personal Computing, vol. 96, p. 14.

U.S. Appl. No. 09/801,932, filed Oct. 29, 2003, Office Action.
U.S. Appl. No. 09/801,932, filed Apr. 8, 2004, Office Action.
U.S. Appl. No. 09/801,932, filed Mar. 7, 2005, Office Action.
U.S. Appl. No. 09/801,932, filed Jan. 25, 2006, Office Action.
U.S. Appl. No. 09/801,932, filed Jul. 18, 2006, Notice of Allowance.
U.S. Appl. No. 09/801,932, filed Dec. 28, 2006, Notice of Allowance.
U.S. Appl. No. 10/330,561, filed Jun. 28, 2006, Office Action.
U.S. Appl. No. 10/330,561, filed Dec. 20, 2006, Notice of Allowance.
U.S. Appl. No. 10/330,561, filed May 4, 2007, Office Action.
U.S. Appl. No. 10/330,561, filed Nov. 16, 2007, Office Action.
U.S. Appl. No. 10/330,561, filed Aug. 20, 2008, Office Action.
U.S. Appl. No. 10/330,561, filed Mar. 19, 2009, Office Action.
U.S. Appl. No. 10/330,561, filed Aug. 24, 2009, Notice of Allowance.
U.S. Appl. No. 11/091,272, filed Jun. 18, 2008, Office Action.
U.S. Appl. No. 11/555,431, filed Jun. 10, 2010, Office Action.
U.S. Appl. No. 11/555,431, filed Nov. 19, 2010, Office Action.
U.S. Appl. No. 11/555,431, filed Sep. 20, 2011, Notice of Allowance.
U.S. Appl. No. 12/646,505, filed Sep. 13, 2010, Office Action.
U.S. Appl. No. 12/646,505, filed Nov. 24, 2010, Notice of Allowance.
U.S. Appl. No. 13/345,398, filed Jul. 8, 2013, Office Action.
U.S. Appl. No. 13/345,398, filed May 13, 2014, Notice of Allowance.
U.S. Appl. No. 13/615,102, filed Jul. 3, 2013, Office Action.
U.S. Appl. No. 13/612,838, filed Nov. 10, 2014, Office Action.

Jim Hu, "AOL developing search engine," CNET.com/News—Entertainment & Media—AOL developing search engine, pp. 1/3 [online], (Jun. 21, 1999) [retrieved on Jul. 26, 2000]. Retrieved from the Internet: <URL: http://news.cnet.com/news/0/1005/200/343860.html>.

(56) References Cited

OTHER PUBLICATIONS

Ian Leicht, "Re: My spamblock; Was: Thwarting UCE address culling programs" [online]. Jan. 26, 1997. Retrieved from Internet newsgroup: <news.admin.net/abuse.email> [retrieved on Jul. 15, 2003], pp. 1/2.
Related U.S. Appl. No. 10/774,369.
Related U.S. Appl. No. 09/801,932.
Related U.S. Appl. No. 11/091,272.
Related U.S. Appl. No. 11/555,431.
"Guradian Setup Instructions" [online], America Online [retrieved Nov. 23, 2004]; retrieved from the Internet: http://challenevents.aol.com/guardian/images/print/instructions:gif.
"Instant Messaging is Everyone's Business," Yahoo Business Messenger, Yahoo! 2003.
"SurfControl Instant Message Filter," Instant Message Filter, SurfControl plc. 2003.
"Spammers Target Instant Message Users," http://www.bizreport.com/article.php?art_id=5507 Nov. 13, 2003, pp. 1/4.
"Jabber" http://www.jabber.com/index.cgi?CONTENT_ID=9, as accessed on Dec. 4, 2003.
"Pending Database for KnockKnock," http://www.knockmail.com/support/penddatabase.html, pp. 1, as accessed on Dec. 4, 2003.
http://www.knockmail.com/support/newsettings.jpg, as accessed on Dec. 4, 2003.
SpectorSoft Corporation, Industry Leading Spy Software Company Announces Instant Messaging Feature in Spector Professional Edition, Apr. 24, 2002.
SpectorSoft Corporation, SpectorSoft Corporation Ships Major Upgrade of eBlaster, Aug. 21, 2002.
Press release, SpectorSoft Corporation, SpectorSoft Announces New Version of Award Winning Spector Software, May 18, 2000.
Business Wire, Jul. 26, 2006, Bethpage, New York.
Office Action, U.S. Appl. No. 11/091,272, dated Jun. 18, 2008, 27 pages.

* cited by examiner

SUPERVISING USER INTERACTION WITH ONLINE SERVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation of, and claims priority to, U.S. patent application Ser. No. 10/330,561 entitled "Supervising User Interaction With Online Services," which was filed on Dec. 30, 2002. The disclosure of the above application is incorporated by reference in its entirety.

TECHNICAL FIELD

The following description relates generally to the supervision of user interaction with online services.

BACKGROUND

The Internet is a global network that may be used to access information that is directed to many different topics. For example, information may be accessed regarding religions, cultures, ideologies, and lifestyles, some of which may be considered offensive to certain individuals. In addition, Internet accessible information may be considered graphic, violent, harmful, illegal, or sexual, and, therefore, inappropriate for certain users. As such, parents and/or guardians may wish to regulate access to information made available to online users under their supervision.

The Internet also provides various communications techniques, such as instant messaging, e-mail, and chat rooms that provide an easy medium to contact any number of individuals, entities, or organizations throughout the world. Parents and/or guardians may wish to regulate such communications.

Various mechanisms, such as parental controls, have been developed to regulate access to information and communications available from the Internet and online service providers. However, new methods and technology continue to be developed to supplement traditional mechanisms for regulating access to information and communications.

SUMMARY

In one general aspect, a guardian system includes an interface to receive data related to activities of a first account; a guardian host to collect the first account activity data and to generate a report card based on the collected first account activity data; and an interface to provide access to the report card to a second account that is associated with the first account and that exercises some control over the first account.

The report card may include one or more windows to display activity lists indicating the online activity on a host network by the first account. The report card indicates online activity, such as web access activity, instant messaging activity, and e-mail activity by the first account.

The report card may include a web access window including an activity list having one or more identifiers associated with web sites that were accessed by the first account, with one or more of the identifiers being selectable to enable viewing of a web sites associated with a selected identifier. The web access window may include an input to enable the guardian host to block future access by the first account to one or more web sites associated with the identifiers on the activity list.

The report card may include an attempted access window including an activity list having one or more identifiers associated with web sites that the first account attempted to access, with one or more of the identifiers being selectable to enable viewing of a web sites associated with the identifiers on the activity list. The attempted access window includes identifiers of web sites for which access was attempted by and denied to the first account, and an input receiving interface by which the second account may enable the first account to access the one or more web sites.

The report card may include an instant messaging window including information regarding instant massage activity associated with the first account. The instant messaging window includes an input to enable access to a contact list associated with the first account. The information includes an indication of changes to a contact list and identifications of one or more identities that received an instant message from the first account or sent an instant message to the first account.

The report card window may include an e-mail window including information regarding e-mail activity associated with the first account. The e-mail window includes an input interface to enable access to a user address book associated with the first account. The information includes an indication of changes to an address book associated with the first account and identification of one or more identities that received e-mail from the first account or sent e-mail to the first account.

The report card may include a parental controls window listing one or more services for which parental controls are applied and an indication of the level of access by the first account to the services. The parental controls window includes an input to edit parental control settings associated with the first account.

Other features will be apparent from the description, the drawings, and the claims.

DESCRIPTION OF DRAWINGS

Like reference symbols in the various drawings indicate like elements.

DETAILED DESCRIPTION

As described above, a parent or guardian may wish to closely supervise a child's online activities. However, many parents are not able to closely monitor their children at all times. Although filters and services provide some restriction on activities, these systems are not meant to replace entirely a parent's supervision. The guardian system and methods provide an additional tool for a parent or other entity to monitor and supervise a user's online activities.

In one implementation, a report card provides a supervisor or master account holder (e.g., a parent) with information about the activities of an individual or sub-account user (e.g., a child). For example, the report card may include a list of the sites (e.g., content identifiers and/or uniform resource locators) that an individual has visited or attempted to visit. Other information (e.g., e-mail and address book activity and instant messaging and contact list activity) also may be provided in addition to tools that allow the master account holder to access information about the activities. The report card and corresponding systems and methods are described in greater detail below.

Figure 1:
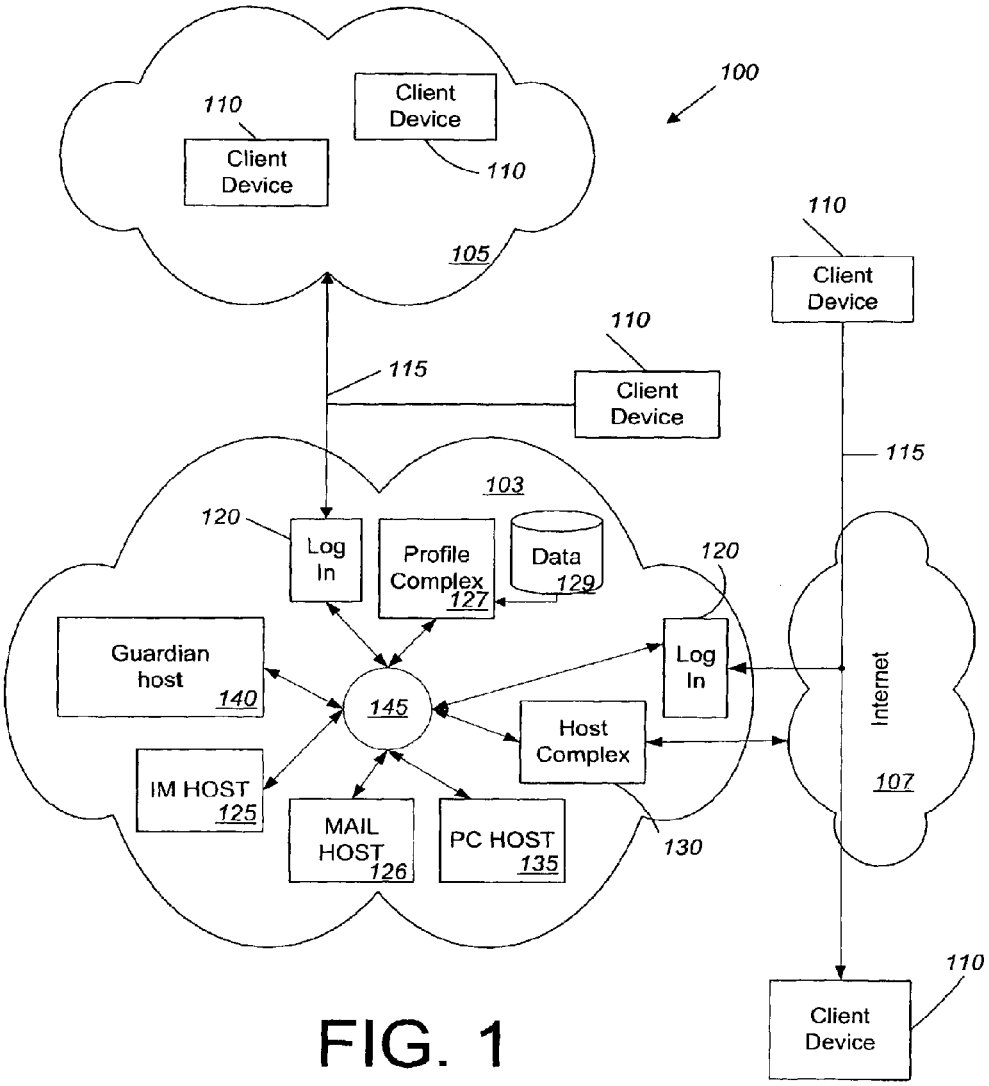
FIG. 1 is a block diagram of an exemplary system for supervising user interaction with online services.

As shown by the exemplary implementation illustrated FIG. 1, a communications system 100 may include a number of networks (e.g., a host network 103, an intranet 105, and the Internet 107) that provide network online services, content, and resources to one or more client devices 110 and their users. Using communications paths 115, the client devices 110 may connect to the host network 103 directly, or the client devices 110 may connect to the host network 103 indirectly through the intranet 105 or the Internet 107. Once connected, the client devices 110 provide access to services and content provided by the host network 103.

The host network 103 may be implemented using any number of components and/or network devices (e.g., hubs, routers, switches, servers, repeaters, storage devices, communications interfaces, processors, and various communications media) to establish a local area network (LAN), a wide area network (WAN), a switched network, a radio network, a cable network, a satellite network, or a combination of two more of these networks.

In particular, the host network 103 may include one or more host devices or systems to provide access to the devices, services, and resources of the host network 103. The host devices may include one or more of a login host 120, an instant message host 125, an e-mail host 126, a profile complex 127, a database 129, a host complex 130, a parental control host 135, and a guardian host 140. The hosts may provide one or more online services, such as web access, searching, personalized web pages, e-mail, instant messaging, chatting, shopping, and parental controls.

The host devices and systems may exchange or access data using a host network communications structure 145 that may include communications media, servers, routers, switches, processors, storage, interfaces, and gateways (e.g., for conversion of protocols between host devices, if necessary).

The client devices 110 may be operated by one or more users to access the host network 103 and its services. An example of a client device 110 is a general-purpose computer capable of responding to and executing instructions in a defined manner. Client devices 110 also may include a special-purpose computer, a personal computer ("PC"), a workstation, a server, a laptop, a Web-enabled phone, a Web-enabled personal digital assistant ("PDA"), an interactive television set, a set top box, an on-board (i.e., vehicle-mounted) computer, or a combination of one or more these devices capable of responding to, generating, and/or executing instructions. The client device 110 may include any number of other devices, components, and/or peripherals, such as memory/storage devices, input devices, output devices, user interfaces, and/or communications interfaces.

The client device 110 also may include one or more software applications (e.g., an operating system, a browser application, a microbrowser application, a server application, a proxy application, a gateway application, a tunneling application, an e-mail application, an IM client application, an online service provider client application, and/or an interactive television client application) loaded on the client device 110 to command and direct the client device 110. Applications may include a computer program, a piece of code, an instruction, or some combination thereof, for independently or collectively instructing the client device 110 to interact and operate as desired.

The applications may be embodied permanently or temporarily in any type of machine, component, physical or virtual equipment, storage medium, or propagated signal wave capable of providing instructions to the client device 110. In particular, the applications may be stored on a storage medium or device (e.g., a read only memory (ROM), a random access memory (RAM), a volatile/non-volatile memory, or a magnetic disk readable by the client device 110, such that if the storage medium or device is read by the client device 110, the specified steps or instructions are performed.

The client device 110 also includes one or more communications interfaces that allow the client device to send and receive information using the communications paths 115.

The communications paths 115 may be configured to send and receive signals (e.g., electrical, electromagnetic, or optical) that convey or carry data streams representing various types of analog and/or digital content. For example, the communications paths 115 may be implemented using various communications media and one or more networks comprising one or more network devices (e.g., servers, routers, switches, hubs, repeaters, and storage devices). The one or more networks may include a WAN, a LAN, a plain old telephone service (POTS) network, a digital subscriber line (DSL) network, an integrated services digital network (ISDN), a synchronous optical network (SONNET), or a combination of two or more of these networks. In addition, the communications paths 115 may include one or more wireless links that transmit and receive electromagnetic signals, such as, for example, radio, infrared, and microwave signals, to convey information.

The client device 110 may establish a connection (through a communications path 115) to a login host 120. The login host 120 may include one or more servers, processors, and other communications media to provide access to the host network 103 using an ISP client and/or a browser application. The login host 120 may determine whether a particular user of a client device 110 is authorized to access the host network 103 (e.g., by verifying a user identification and a password). If the user is authorized to access the host network 103, the login host 120 may facilitate establishing communications between the client device 110 and the host network devices corresponding to any services desired by the user.

Once communications with the host network 103 have been established, the client device 110 may directly or indirectly transmit data to and access content and services from the hosts. For example, the client device 110 may establish a connection with the host complex 130 to browse the Internet; access web pages; shop online; get customized news, weather, and stock quotes; and search the World Wide Web.

The host network 103 includes one or more user profile complexes 127 connected to a database 129 to store user profile data. The user profile complex 127 may include one or more user profile servers and other devices allowing the entering, retrieving, editing, manipulating, or otherwise processing of user profile data. In one implementation, user profile data may include a user contact list, an address book, identified interests, a geographic location, a type of account, and demographic information. The user may use a client application or a browser on the client device 110 to interact with the user profile server and perform various functions if authorized (e.g., enter, edit and/or delete profile data).

The user profile data also may be stored by the client device 110. For example, a storage medium associated with the client device 110 may store user account information, a contact list, and/or an address book. In one implementation, the user profile data stored by the client device 110 may be provided to the host network 103 when needed (e.g., at specified times or upon request). In another implementation, the user profile data may be stored by both the client device 110 and the host network 103 and periodically synchronized (e.g., at logon, logoff, or when appropriate).

If the user profile data is stored by the host network 103, the user does not have to reenter or update such information in the event that the user accesses the host network 103 using a new or a different client device 110. Accordingly, when a user accesses the host network 103, the login host 120 can instruct the user profile complex 127 to retrieve the user profile data from the database 129 and to provide, for example, user data to a host as needed.

A user may establish an account to gain access to the host network 103. The account may be a general account, a master account, or a sub-account. A master account may be associated with or linked to one or more sub-accounts and may exercise at least some control over the sub-accounts. In one implementation, the master account also may create one or more associated sub-accounts. In another implementation, the master account may be associated with or linked to one or more existing sub-accounts. An identifier, (e.g., a screen name) may be associated with each sub-account and stored with the user profile data. For example, a master account holder may create a sub-account and a screen name for a child that is used as the child's online identity to communicate with others through chat, message boards, instant message notes, and games. The screen name also may be used to create an e-mail address.

As previously described, it may be desirable to restrict access by certain users (e.g., children) to content and services provided by or made available through the host network 103. A master account holder may communicate with the parental control host 135 to establish a content advisor for any of the sub-accounts associated with the master account. The content advisor may be used to filter out content and online services that are not suitable for an expected user of the sub-account.

The master account holder may adjust the level of content exposure according to the age and maturity of the sub-account user. The master account holder also may set limits on specific activities within which the sub-account user may participate (e.g., chats, instant messages, e-mail, newsgroups, and file downloads).

When a screen name is created for a sub-account, a basic parental controls category may be selected by the master account holder. Each category has predefined limits or constraints associated with online services (e.g., e-mail, instant messaging, Web content access, and/or chat) provided by the host network 103. The categories help to determine the general level of access to these services by the sub-account user. For example, parental controls categories may include kids only, young teen, and mature teen.

Kids only may refer to children ages 12 and under, and may be used to restrict children's access to certain services and content of host network 103 and the Internet 107. Young teens may refer to children ages 13-15, and may be used provide more freedom than the kids only category while preventing full access to content or services. Mature teen may refer to children ages 16-17, and may be used to allow the most freedom of all the categories. Mature Teens may access all services and content on the host network 103 and the Internet 107, except certain sites restricted to an adult (18+) audience. The categories associated with a sub-account may be changed and/or customized at any time by the master account holder.

After creating a sub-account, choosing an associated screen name, and selecting a basic parental controls category, the master account holder may customize the sub-accounts access to specific online services provided by the host network 103. For example, parental controls enable the master account holder to determine who can and cannot send e-mail to the sub-account. For additional control, a second screen name may be associated with the sub-account that may be used only for chat (e.g., blocking all e-mail to the second screen name so that a child will not receive unsolicited commercial e-mail ("spam") after chatting online).

The parental controls also may be used to set up a guardian service provided by the guardian host 140. The guardian service monitors and provides a record of the sub-account's online activity. A report card may be provided or made accessible to the master account holder for each sub-account, as explained in detail below.

The guardian host 140 may include one or more servers, storage, and communications infrastructure to monitor the activities of one or more sub-account users while online, to collect data associated with the sub-account online activity, and to provide an interface for interactive guardian services provided to the master account holder.

At the end of a sub-account's session (or at a designated time as explained below), the collected data may be reported to the master account holder. For example, a guardian host communications server may deliver the collected data to the master account holder (e.g., to an e-mail address associated with the master account). In another implementation, the collected data may be made accessible to the master account holder so that the master account holder may access and view collected data (e.g., using a link proved by the browser or ISP client applications).

The collected data may be provided as a report card of the sub-account activities. The report card may be used by the master account holder to determine the sub-account's online activities and to set, control, adjust, and fine-tune parental controls associated with the sub-account. The report card also may be used by the master account holder to recognize and to enable access to different or previously-restricted online services provided by the host network 103.

Figure 2:
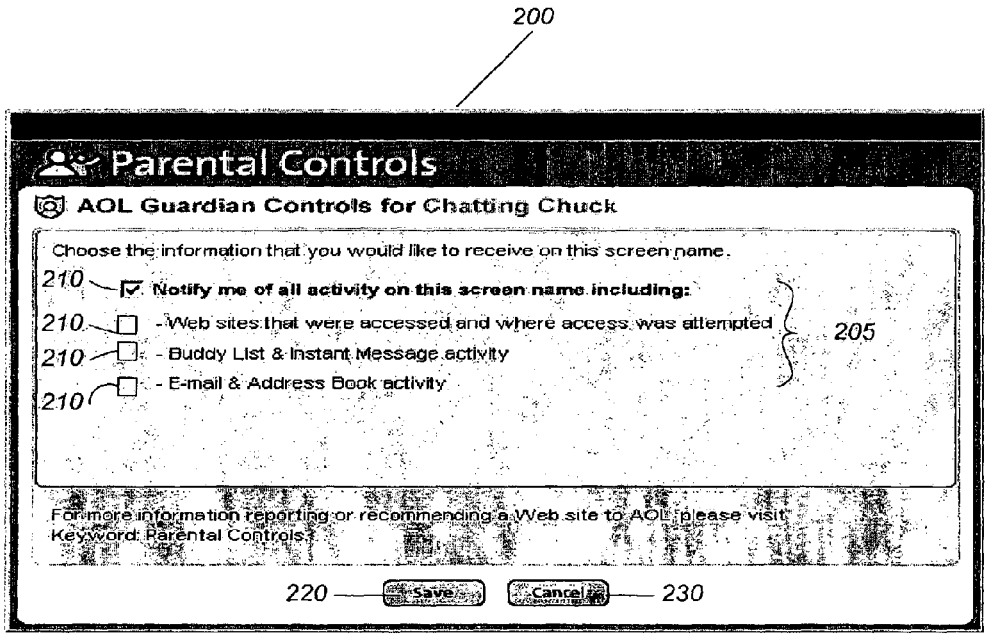
FIG. 2 shows an exemplary graphical user interface that may be used in the system of FIG. 1 and includes options for supervising user interaction with online services.

When the master account holder sets parental controls for a sub-account, the master account holder is given the option to activate the guardian service. For example, as shown in FIG. 2, the master account holder may be presented with a guardian control window 200 for a sub-account.

The window 200 includes a list 205 of activities/services (e.g., all activity, e-mail, address book, chat, instant messaging, contact list, web sites/web activity) that may be monitored for the sub-account. Each of the activities and/or services may have an associated input 210 (e.g., a check box) that may be selected by the master account holder using the client device 110 to activate monitoring of the associated activity. In addition, inputs (e.g., virtual buttons 220 and 230) may be used to save the guardian settings or cancel the window (e.g., if the guardian service is not wanted or if the current settings are satisfactory). An indication of each monitored activity and/or service may be stored in the user profile associated with the sub-account.

Thereafter, when a sub-account accesses the host network 103, the login host 120 checks the user profile to determine whether the guardian service is activated. If activated, the login host 120 notifies the guardian host 140, and the guardian host 140 accesses the user profile to determine which activities/services are selected to be monitored.

The guardian host 140 may collect data regarding the sub-account's activities by monitoring the activities of the sub-account or the services requested by the sub-account. The guardian host 140 uses the collected activity data to create a report card for the sub-account.

In one implementation, the guardian host 140 contacts any network hosts associated with the monitored activities/services to send reports of the activities of the sub-account to the guardian host 140. The designated hosts report the sub-account's activities to the guardian host 140. The guardian host 140 collects the reported activity.

In another implementation, a token, a flag, metadata or another identifier may be associated with the sub-account or sub-account identifier to indicate that the guardian service has been activated for the sub-account. As a result, any host device servicing the sub-account may determine the presence of the identifier and report to the guardian host 140 the activities provided to the sub-account.

The report card may include a description of one or more activities of the sub-account while the sub-account is connected to the host network 103. For example, the report card may include web sites or online resources that were successfully accessed, web sites or online resources for which access was attempted but denied, the number of times a specific web sites or online resource was visited or attempted to be accessed, an indication of additions and deletions that were made to the sub-account's contact list and address book, the ability for the master account holder to review a current copy of any sub-account's contact list and address book, how much time the sub-account spent online or visiting one or more web sites, the time of online usage or visitation/attempted access of particular web sites or online resources, and current administrative (e.g., parental controls) settings for the sub-account. The report card also may include an interface or tool that allows a master account holder to adjust parental control settings and/or obtain additional information regarding the sub-account activities, as described in detail below.

The guardian host 140 may provide the report card to the master account holder using a communications format compatible with the communications applications of the client device 110 of the master account holder. For example, the report card may be sent to an e-mail address associated with the master account. The guardian host 140 also may notify the master account holder that the report card is accessible, and the master account holder may access the report card using the client device and the browser or the ISP applications. In another implementation, the report card may be stored on the host network 103 and updated by the guardian host 140. In this case, the master account holder may access the report card whenever the master account holder is connected to the host network 103. Notification or delivery of the report card typically is provided on a periodic basis. For example, the report card may be sent when a monitored sub-account user logs off, when storage/memory saving the collected data associated with a sub-account is full, or at specified times (e.g., hourly, daily, weekly, and monthly). As a precaution, the guardian host 140 may send a notification (e.g., an e-mail) to the master account holder if the guardian service is deactivated, and the master account holder may verify that the guardian service should be deactivated. This process of notification and verification may be used to minimize or avoid accidental or unintended disruption of the guardian service.

In addition to the report card, the guardian host 140 may provide an online link to a history of activity for a corresponding sub-account. The history may be accessed by the master account when linked to the host network 103. The history may provide access to any of the data collected by the guardian host 140 for the sub-account and report card over a period of time (such as, e.g., a week, a month, and/or a year). The collected data may be organized (e.g., by date and/or category) to aid viewing by the master account. The history also may be downloaded to the client device 110 of the master account holder.

In another implementation, a separate report host may used to generate and provide the report card to the master account. In this implementation, the report host receives the collected data from the guardian host and creates the report card and history. The report host also may provide access to and/or deliver the report card to the master account. The report host also may provide a link for access to the sub-account's history.

Figure 3:
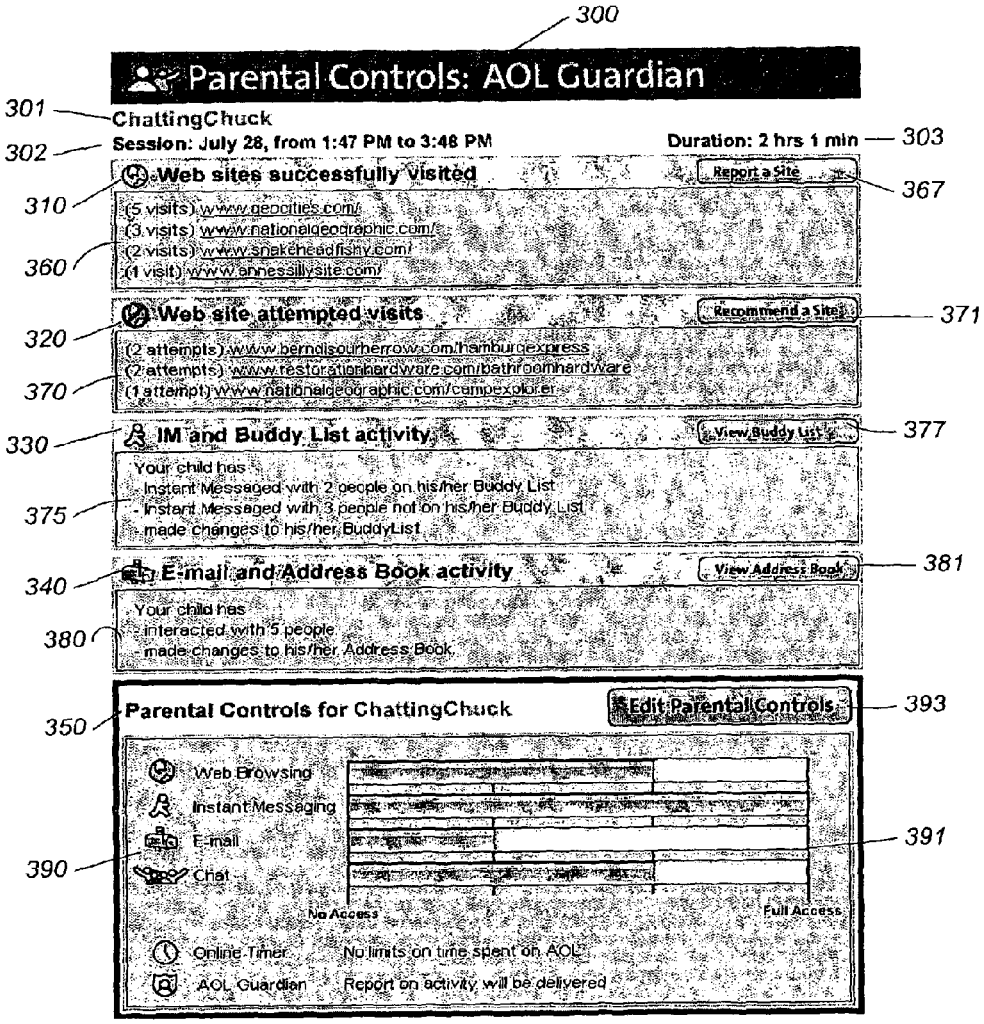
FIG. 3 shows an exemplary graphical user interface for a report card that may be provided by the system of FIG. 1.

FIG. 3 shows an exemplary graphical user interface 300 for a report card associated with a sub-account. The report card may include a sub-account identifier 301 (e.g., a screen name), session information 302 (e.g., a date and a time range), a duration of session 303, one or more activity windows (e.g., a web sites successfully visited window 310, a web site-attempted-visits window 320, an IM-and-contact-list activity window 330, and an e-mail-and-address-book-activity window 340) and a parental-controls window 350.

The web sites successfully-visited-window 310 includes a list 360 of web sites visited by a sub-account holder. For example, the list 360 may include one or more uniform resources locators (URLs) with corresponding hyperlinks. Selecting a URL causes a browser of the client device 110 to access the site associated with the selected URL so that the master account holder may view the site and determine if the site is appropriate for the sub-account user. The number of visits to a site may be associated with each listed URL.

A report-a-site virtual button 367 or other input is provided. Selecting the report-a-site virtual button 367 allows the master account holder to report to the guardian host 140 a site that was accessed by the sub-account and to which the master account holder wishes to restrict access by the sub-account in the future. The guardian host 140 may use any sites reported by the master account holder to update a list of sites to which the sub-account should be denied access. The guardian host 140 also may notify the parental controls host 135 about the reported site so that the site may be evaluated with regard to parental controls of other sub-accounts associated with the master account, or with regard to parent controls generally (e.g., access to the identified site may be denied for teens if a threshold number of the master account holders indicate the site as inappropriate for their teen sub-accounts).

The web site-attempted-visits window 320 includes a list 370 of web sites that a sub-account user has attempted to visit. For example, the list 370 may include one or more URLs with corresponding hyperlinks. Selecting a URL causes a browser of the client device 110 to access the site associated with the URL so that the master account holder may view the site and determine if the site is appropriate for the sub-account user. The number of attempts to visit a site may be associated with each listed URL.

A recommend-a-site virtual button 371 or other input also may be provided. Selecting the recommend-a-site virtual button 352 allows the master account holder to recommend to the guardian host 140 a site for which access was denied to the sub-account and that master account holder wishes to allow the sub-account to access in the future. The guardian host 140 may use any recommended sites to update a list of sites for which access is permitted by the sub-account or to remove the site from a list of restricted sites. The guardian host 140 also may notify the parental controls host 135 about the recommended site so that the site may be evaluated by the parental controls host 135 with regard to other sub-accounts associated with the master account, or with regard to parent controls generally (e.g., access to the identified site may be allowed for kids only if a threshold number of the master account holders indicate the site as appropriate for their kids only sub-accounts).

The IM-and-contact-list-activity window 330 includes a list 375 of information about the instant messaging activity of the sub-account. For example, the list 375 may include the number of users on the contact list who were contacted, the number of users contacted who are not on the contact list, and whether changes were made to the contact list. In addition, the list 375 may include the screen names of those contacted and/or added to the contact list.

Figure 4:
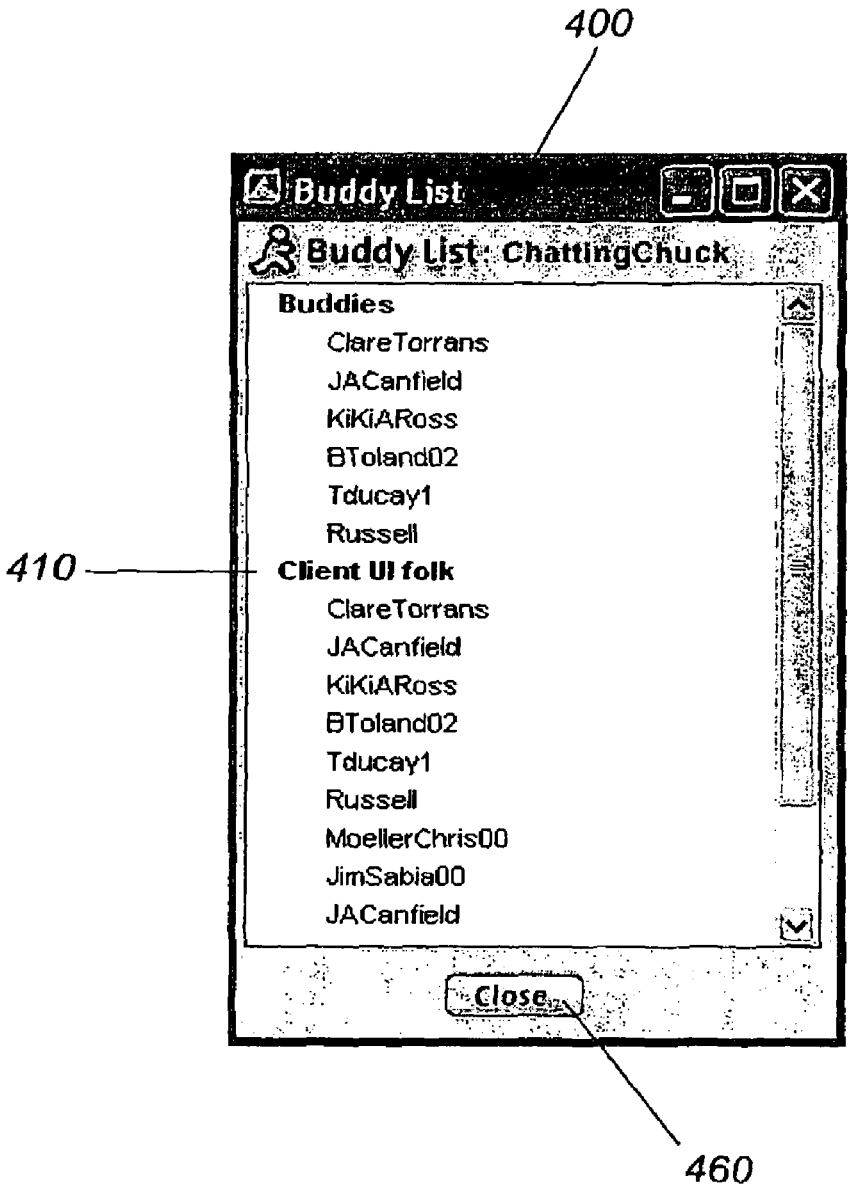
FIG. 4 shows an exemplary graphical user interface for a user contact list that may be accessed using the report card and the system of FIG. 1.

A view-contact-list-virtual button 377 (identified with "View Buddy List" in FIG. 3) or other input also may be provided. Selecting the view contact list virtual button 377 causes the browser of the client device 110 to display a window (e.g., as shown in FIG. 4 and described below) with a list of the contacts for the sub-account.

The e-mail-and-address-book-activity window 340 includes a list 380 of information about the e-mail of the sub-account. For example, the list 380 may include the number of people with which the sub-account interacted and whether changes were made to the address book. In addition, the list may include the e-mail address, name or identifier of any user that was a recipient of e-mail from the sub-account, that was a sender of e-mail to the sub-account, and/or that was added to the address book.

Figure 5:
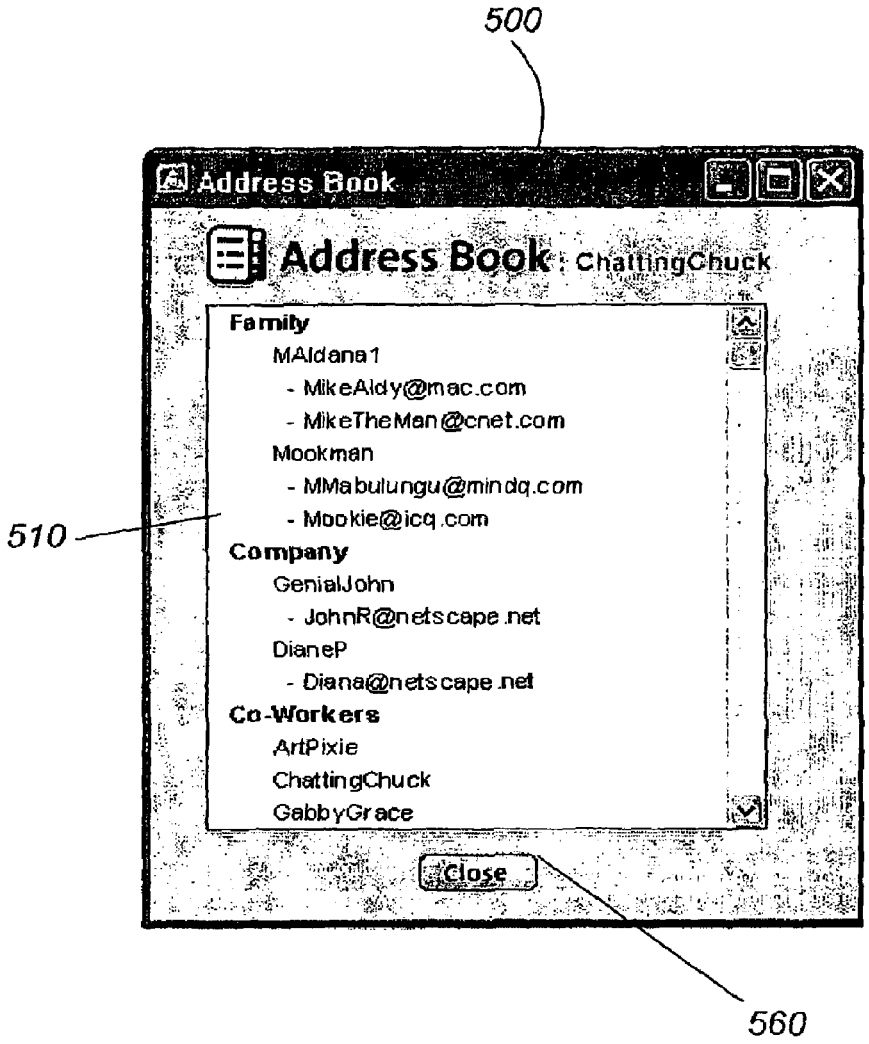
FIG. 5 shows an exemplary graphical user interface for an address book that may be accessed using the report card and the system of FIG. 1.

A view address book virtual button 381 also may be provided. Selecting the view address book virtual button 381 causes the browser of the client device 110 to display a window (e.g., as shown in FIG. 5 and described below) with a list of the contacts in the address book of the sub-account.

The parental-controls window 350 may include the sub-account identifier to which the parental controls are applied. A list 390 includes icons representing the different online services for which parental controls are applied. For example, in the illustrated example, the list 390 includes icons for web browsing, instant messaging, e-mail, chat, an online timer, and AOL guardian. A corresponding visual indication, for example, a bar graph 391, indicates the level of access (e.g., full, intermediate, or no access) for one or more of the online services associated with the sub-account. A virtual button 393 or other input is provided to permit editing of parental controls. Selecting the virtual button 393 causes the browser of the client device 110 to access a parental controls interface provided by the parental controls host 135, so as to allow the master account holder to edit the parental controls of the sub-account.

FIG. 4 shows an exemplary graphical user interface 400 for a sub-account contact list 410. The contact list 410 is presented to the master account holder in response to selecting the view-contact-list virtual button 377.

The contact list 410 may be divided into contact groups. In addition, those names or identifiers that have been changed or added may be indicated using color, shading, highlighting, or some other visual identification, or by placing the names into a separate group. For example, deleted names may be transparent or struck through, and added names may be bolded or highlighted. The master account holder may select any name to remove the name from the contact list or to block access to the sub-account by the identity associated with the name. A close virtual button 460 or other input may be included to close the interface 400.

FIG. 5 shows an exemplary graphical user interface 500 for an address book 510 of a sub-account. The address book 510 may be presented to the master account holder in response to selecting the view-address-book virtual button 381. The address book 510 may be divided into groups (e.g., Family, Company, Co-workers). Identifiers and any corresponding e-mail addresses may be provided. In addition, those names, identifiers, or e-mail addresses that have been changed or added may be indicated using color, shading, highlighting, or some other visual identification, or by placing the names into a separate group. For example, deleted names may be transparent or struck through, and added names may be bolded or highlighted. The master account holder may select any name to remove the name from the address book or to block access by the entity associated with the name to the sub-account. A close virtual button 560 may be included to close the interface 500.

Figure 6:
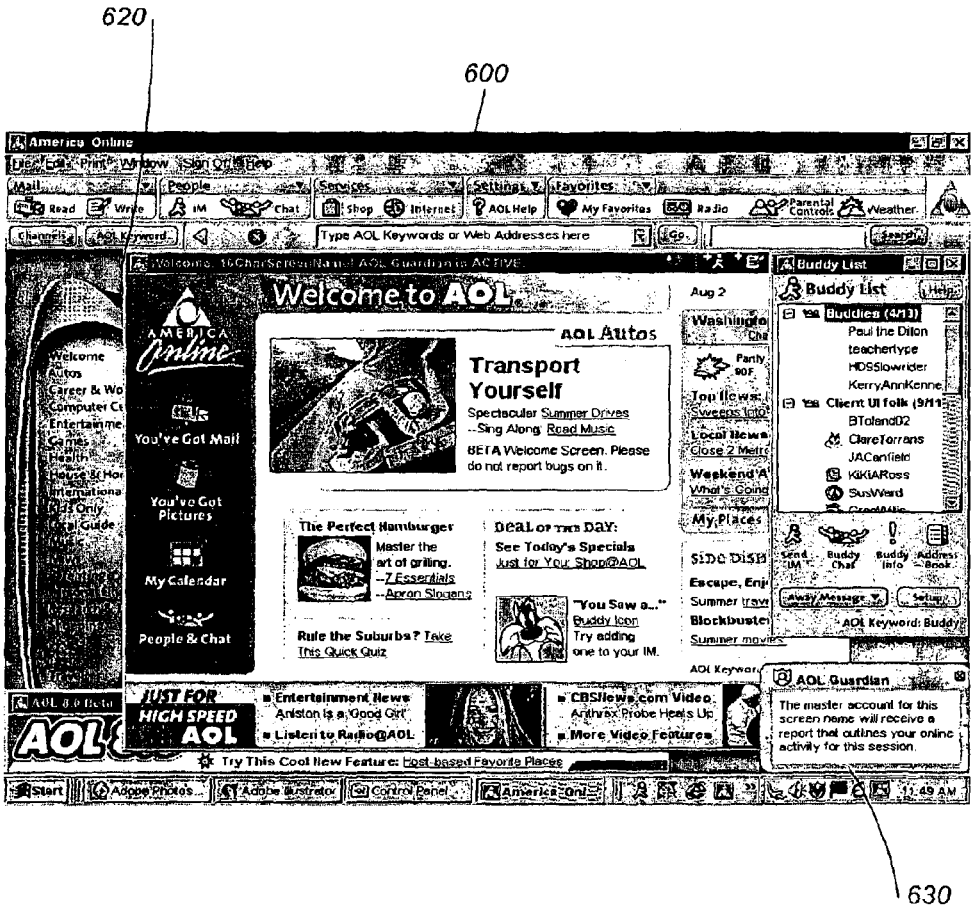
FIG. 6 shows an exemplary graphical user interface that may be used in the system of FIG. 1 to provide online services.

FIG. 6 is a graphical user interface 600 that the host network 103 provides to the client device 110 to access online services provided by the host network 103. The interface may include various tool bars, menus, and windows to provide information to a user and to provide inputs for controlling the interface. In particular, the user interface may include an indication 620 (e.g., a title section of a window) that the guardian service has been activated for the account accessing the graphical user interface. In addition, an indication 630 (e.g., a window) that the master account receives a report that outlines the activity for the sub-account's session also may be provided.

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. A system [for monitoring online activities of a sub-account user over which a master account holder exercises control,] comprising:

a first system, including a first processor that collects activity data regarding online activities of [the] *a* sub-account user and generates an online report based on the activity data, wherein the online report includes one or more inputs for [the] *a* master account holder to provide an access recommendation for a web site; and a second system, including a second processor that automatically denies access by the sub-account user to the web site when a number of negative recommendations provided by other master account holders for the web site exceeds a predetermined threshold.

2. The system of claim 1, wherein the online report includes one or more windows that display one or more activity lists indicating online activity on a host network by the sub-account user.

3. The system of claim 1, wherein the sub-account user is one of a plurality of users of the sub-account.

4. The system of claim 1, wherein profile data for the sub-account user is stored on a client device, and wherein the client device provides the profile data to the first system.

5. The system of claim 1, wherein the sub-account user is one of a plurality of sub-account users controlled by the master account holder.

6. The [method] *system* of claim 1, wherein collecting activity data includes collecting data in response to the online account attempting to access web content.

7. A [guardian] system comprising:

a host computer that collects activity data regarding activities of a sub-account user over which a master account holder exercises control and generates a report card based on the collected sub-account activity data, wherein activity data includes data generated in response to an attempt to access web content; and an interface that electronically provides access by the master account holder to the report card, wherein the report card includes an input by which the master account holder recommends granting access to a web site; and the host computer granting access to the web site when a number of recommendations by other master account holders for the web site exceeds a predetermined threshold.

8. The system of claim 7, wherein the report card includes one or more windows that display one or more activity lists indicating online activity on a host network by the sub-account user.

9. The system of claim 8, wherein the sub-account is utilized by other users in addition to the sub-account user.

10. The system of claim 8, wherein profile data for the sub-account is stored on a client device, and wherein the client device provides the profile data to the host computer.

11. The system of claim 8, wherein the sub-account is one of a plurality of sub-accounts controlled by the master account.

12. [An online reporting] *A* system comprising:

a memory device; and at least one processor that performs tasks including:

collecting activity data regarding Internet activities associated with an online account, storing the activity data in the memory device, and generating a report reflecting the Internet activities associated with the online account based on the activity data, wherein the report includes data identifying a web site that the online account requested access and a link that allows a user to access the identified web site, and wherein the report further includes an input by which the master account holder recommends granting access to a web site; and

[the host computer] granting access to the web site when a number of recommendations by other master account holders for the web site exceeds a predetermined threshold.

13. The [online reporting] system of claim 12, wherein online account is utilized by more than one user.

14. The [online reporting] system of claim 12, wherein profile data for the online account is stored on a client device, and wherein the processor receives the profile data from the client device.

15. The [online reporting] system of claim 12, wherein the online account is a sub-account of a master account.

16. The [method] *system* of claim 12, wherein collecting the activity data includes collecting data related to web content accessed by a user of the online account.

17. The [method] *system* of claim 12, wherein collecting activity data includes collecting data corresponding to an attempt by the online account to access web content.

18. The system of claim 12, wherein the report includes a controls window listing one or more services for which monitoring controls are applied and an indication of a level of access by the online account to the one or more services.

19. The system of claim 12, wherein the controls window includes an input to allow editing of one or more control settings associated with the online account.

*20. The system of claim 1, wherein the activity data regarding online activities of a sub-account user includes data regarding contact list activity.*

*21. The system of claim 1, wherein the activity data regarding online activities of a sub-account user includes messaging activity.*

*22. The system of claim 7, wherein the activity data further includes data regarding contact list activity.*

*23. The system of claim 12, wherein the report further includes information regarding contact list activity.*

*24. A method comprising:*

*monitoring online activities associated with a first user of an online account to collect activity data associated with the online account, the activity data including contact list activity data;*

*generating, using at least one processor of at least one computing device, a report reflecting information associated with the collected activity data including information associated with the contact list activity data, wherein the report indicates web sites where access is granted or restricted for the first user based on a threshold number of recommendations by multiple master account holders, and includes a listing of second users that have interacted with the first user and that are not on a contact list associated with the first user;*

*providing the report to a master account holder associated with the first user of the online account; and*

*providing one or more controls, using the at least one processor, for the master account holder to restrict the online activities of the first user of the online account.*

*25. The method of claim 24, wherein the online account is a sub-account associated with an account of the master account holder.*

*26. The method of claim 24, wherein the first user is a child of the master account holder.*

*27. The method of claim 24, wherein the master account holder report includes a controls window listing one or more services for which monitoring controls are applied and an indication of a level of access by the online account to the one or more services.*

*28. The method of claim 27, wherein the controls window further includes an option for selection among a plurality of predefined levels of user restriction that may be applied to the online account.*

*29. The method of claim 24, wherein the report identifies one or more contacts with which the first user has interacted.*

*30. The method of claim 24, wherein the report identifies one or more changes to a contact list associated with the first user.*

*31. The method of claim 24, wherein the one or more controls includes a control for removing a particular contact from a contact list associated with the first user.*

*32. The method of claim 24, wherein the one or more controls includes a control for blocking access by a particular contact to the online account of the first user.*

*33. The method of claim 24, wherein the listing is a first listing, and wherein the report includes a second listing of users that the first user has contacted through the online account or that have contacted the first user through the online account.*

*34. The method of claim 24, further comprising enabling the master account holder to access information associated with users that have interacted with the first user.*

*35. The method of claim 24, wherein the contact list activity data comprises messaging activity data.*

* * * * *